Feb. 20, 1945. N. L. CAHNERS 2,369,944
MATERIALS HANDLING PALLETS ADAPTED FOR USE AS ACCESSORIES
IN FORK LIFT TRUCK OPERATIONS
Filed May 14, 1943 2 Sheets-Sheet 1
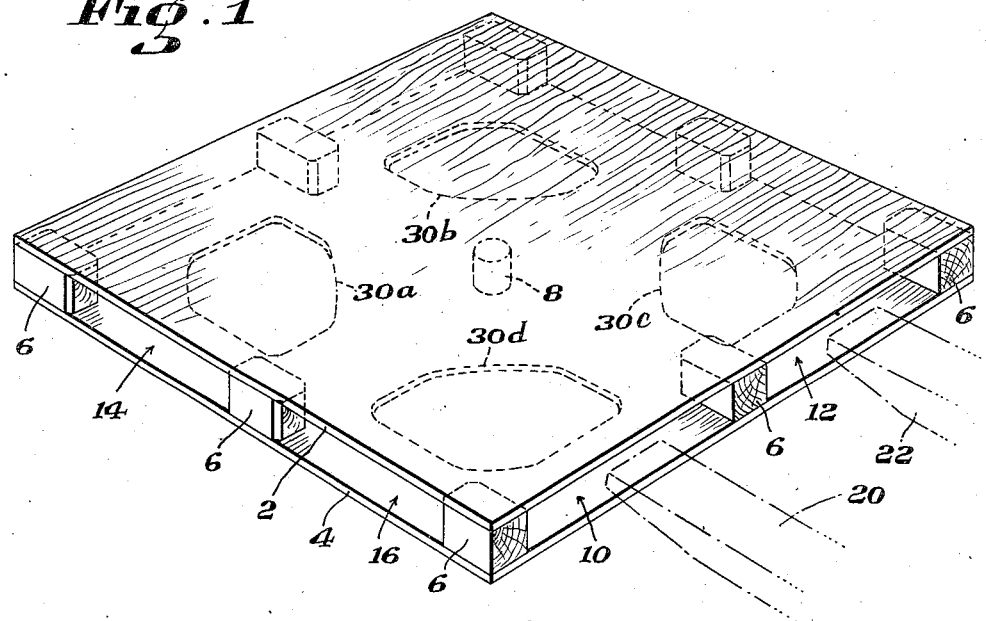
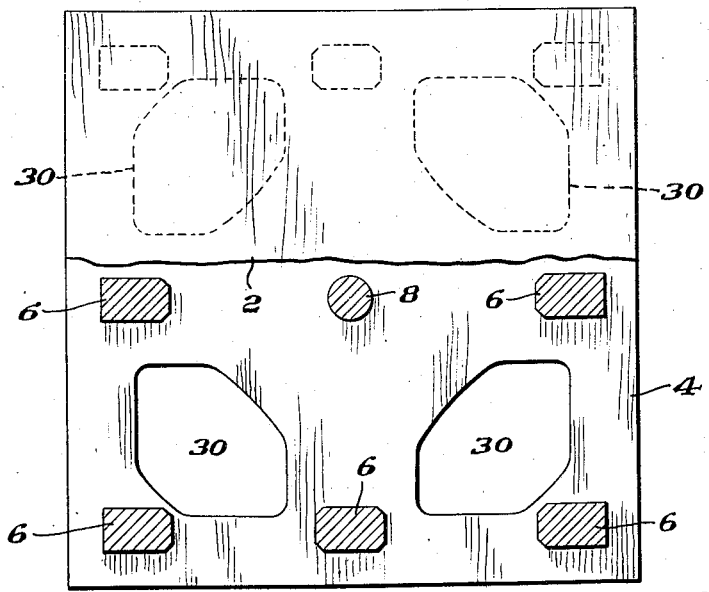
INVENTOR
Norman L. Cahners
BY Rowland V. Petrick
ATTORNEY Feb. 20, 1945.   N. L. CAHNERS   2,369,944
MATERIALS HANDLING PALLETS ADAPTED FOR USE AS ACCESSORIES
IN FORK LIFT TRUCK OPERATIONS
Filed May 14, 1943   2 Sheets-Sheet 2
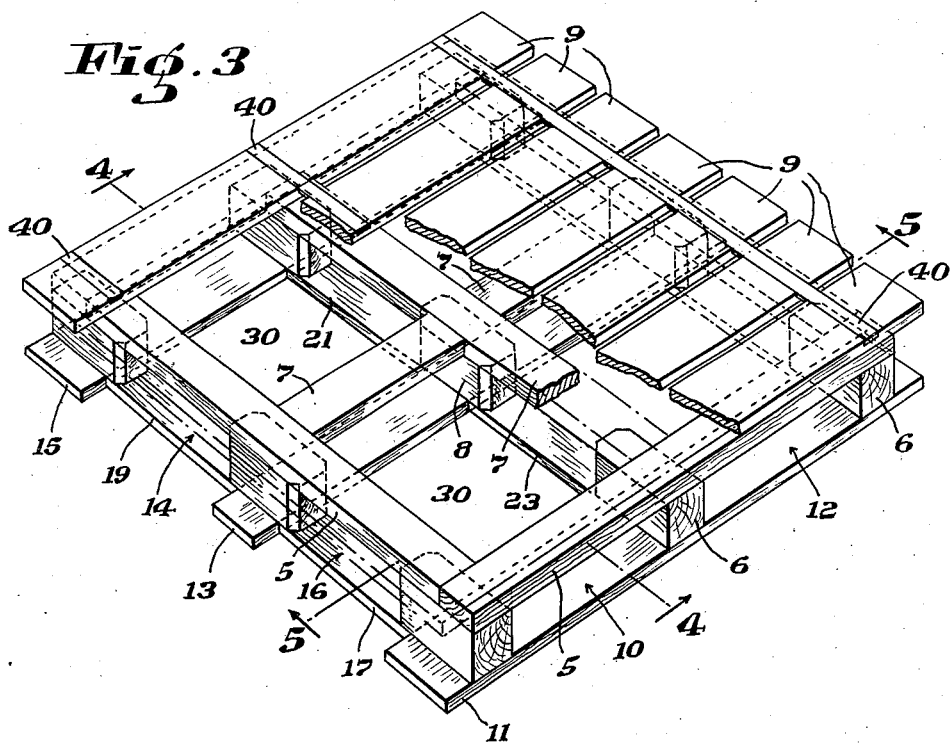
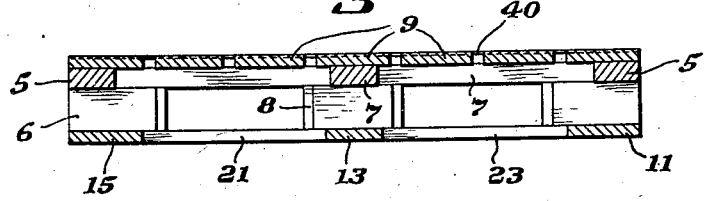
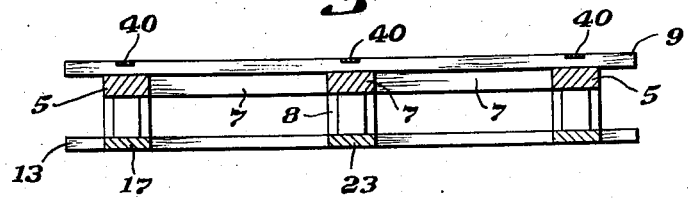
INVENTOR
Norman L. Cahners
Rowland J. Patuck
BY
ATTORNEY Patented Feb. 20, 1945

2,369,944

UNITED STATES PATENT OFFICE 2,369,944

MATERIALS HANDLING PALLETS ADAPTED FOR USE AS ACCESSORIES IN FORK LIFT TRUCK OPERATIONS

Norman L. Cahners, Hingham, Mass.

Application May 14, 1943, Serial No. 487,026

4 Claims. (Cl. 248—120)

This invention relates to materials handling and is concerned particularly with an improved pallet for receiving and supporting articles for transportation as a unit.

The use of fork lift trucks to expedite materials handling is now common. Such trucks are conventionally provided with a pair of spaced horizontally projecting parallel forks which may be operated from the truck to raise and support materials so that the truck may convey them to a new position. Many such trucks have a sufficient vertical fork lift to permit the trucks to pile materials one on another. In order to overcome any requirement for manually loading and unloading the forks with the goods, it is desirable to elevate the goods so that the forks may run beneath them. For this purpose materials to be transported, such as cartons, may be loaded on elevated platforms or pallets, and each pallet and its load can then be handled by a truck as a unit to load a freight car or ship, etc. The loaded pallets are usually transported to the destination of the goods as units so that unloading of the car or ship can be done by similar trucks. The pallets are generally of such over all dimensions that the forks of a truck can extend entirely across the pallet and permit a balanced lift.

It is an object of this invention to provide a pallet which will minimize the complications of stacking a plurality of loaded pallets with fork lift trucks in confined spaces such as in warehouses, freight cars, ships' holds, etc., by permitting ready packing of the pallets in corners, and ready unstacking of the pallets without following in reverse any particular order established by the stacking.

To this end, one of the features of my pallet, in rectangular form, is that it may be lifted by a fork lift truck from any one of the four sides of the pallet.

The construction of my pallet is shown in the accompanying drawings, in which.

Fig. 1 is a perspective view of the pallet with diagrammatic indications in dot and dash lines of the forks of a lift truck;

Fig. 2 is a plan of a modified construction, with a part broken away;

Fig. 3 is a perspective view of a further modified form of my pallet;

Fig. 4 is a cross-sectional view taken along the line 4—4 of Fig. 3; and

Fig. 5 is a cross-sectional view taken along the line 5—5 of Fig. 3.

In the preferred form of my construction, illustrated in Fig. 1, the platform 2 is formed of a single sheet of plywood, for instance 5-ply plywood, which is maintained in spaced elevated relation to a base 4 of similar plywood by the interposition of a series of supporting and spacing blocks 6, to which both base and platform plywood sheets are firmly secured as by nails, bolts, or other fastening means. Additionally, a central block 8 is provided to support the platform centrally. In a typical pallet, the over all dimensions may be 4' x 4' x 5". With such dimensions the blocks 6 may conveniently be 4" x 4" x 6", as shown, and the plywood 5/8" in thickness.

As thus constructed, the pallet is provided along each of its four sides with a pair of openings, such as 10 and 12, 14 and 16, each of which leads into a passageway extending entirely across the pallet between the base and platform. As shown in Fig. 1, conventional lift truck forks 20 and 22 may thus run in between the base and platform through the openings 10 and 12 on the right hand side of the pallet, as shown in Fig. 1, or through the openings 14 and 16 on the adjacent left hand side of the pallet as shown in Fig. 1. Often the forks are about 50" long so that they will extend entirely through the pallet and permit a balanced lift. If desired, the spacing members 6 may be beveled, as shown in certain instances in Fig. 1, to prevent the forks from catching on sharp edges around the openings. For similar reasons, I prefer to have the central block 8 of circular construction as shown. Since the pallet construction is symmetrical as shown in Fig. 1, the pallet will accommodate the forks on any of its four sides.

An additional feature of my construction, as shown in Fig. 1, is that it is also adapted to accommodate the forks 20 and 22 when the lift truck approaches from a corner of the pallet. For instance, the forks 20 and 22 may be guided into openings 16 and 10 respectively, so that they straddle the corner block 6 and the central block 8. Similarly, the forks may be guided beneath the platform 2 from any corner of the pallet utilizing adjacent openings on adjacent sides, and straddling the intervening corner block. Since most fork lift trucks of the type to which I have been referring are provided with mechanism for adjusting the forks towards and away from each other in a horizontal plane, leniency is allowed in the particular dimensions of the openings and passageways of the pallet.

Tests have shown that a pallet constructed as above described will satisfactorily support loads up to and above 18,000 lbs., fully adequate to meet any requirements which would be encountered in known use of these pallets, as this figure exceeds the capacity of the lift trucks.

In addition to fork lift trucks operating on the cantilever principle, there are in common use simpler trucks, usually referred to as low lift trucks, which carry on similar forks near the ends thereof pivoted wheels which can be lowered from the forks by remote control in order to raise the extended end portions of the forks a short distance. In order to permit my pallet to be low-lifted from the sides by such trucks, the base plywood sheet 4 may be provided with a series of openings 30 (30a, 30b, 30c, 30d in Fig. 1), of such shape and contour that the wheels beneath the forks can be lowered therethrough, regardless of from which side the truck approaches the pallet. In the form shown in Fig. 1, the apertures 30 are of such size and contour that each aperture is common to two passageways. Thus, if the forks are run in openings 10 and 12, wheels (not shown) on forks 20 and 22 may be lowered through apertures 30a and 30b respectively, while, if the forks are run in openings 14 and 16, the wheels may be lowered through apertures 30b and 30c respectively.

In Fig. 2 I have shown a modification which adapts the pallet for more ready transportation by slings, in addition to retaining the already referred to constructional features for use with fork lift trucks. In this instance, each of the blocks 6 has been spaced inwardly from the edge of the sheet of plywood, so that a rod may be inserted along each of two opposite edges of the pallet between the overhanging base and platform, with sling ropes attached to each end of the rods.

Figs. 3, 4 and 5 illustrate a modification wherein planking is utilized instead of plywood. Here the blocks 6 are overlaid with 2 x 4's, 5 and 7, laid flat, which provide a rectangular internally criss-crossed framework, to which platform planks 9, portions of which are broken away in Fig. 3, may be nailed or otherwise fastened. Similarly, the base, instead of being a continuous unitary sheet, is made up of a framework of planking 11, 13, 15, and cross inserts 17, 19, 21, 23, etc. As will readily be seen, the openings 10, 12 and 14 and 16 remain, and the pallet is adapted for use in a similar manner to the pallet of Fig. 1. Because, however, the platform is formed of the individual planks 9, the thickness of the pallet is increased by the thickness of the intervening 2 x 4 framework 5, 5, 7, 7, etc. Where it is important to have added strength, metal straps 40 may be countersunk in the top planks. Again, in the form shown in Figs. 3, 4 and 5, the platform overhang is provided, but only on two opposite sides. The framework base provides the apertures 30 for the same purpose as in the construction of Fig. 1, but may be omitted if this type of operation is not desired. In the planking form of my pallet, the planks 9 of the platform are spaced from one another slightly so that straps can be passed between them for holding loads on the pallet.

While I have indicated a square pallet in each case in the drawings, it will be obvious that this shape is taken only as illustrative and as most convenient. Furthermore, in the form of construction shown in Fig. 3, instead of utilizing blocks 6 with an overlying framework of 2 x 4's, 5 and 7, equivalent results can be secured by utilizing 4" x 5" stock provided with cutouts for the openings 14, 16, etc.

The features which permit my pallet to be lifted from any side or from any corner simplify transportation and stacking thereof. Oftentimes a pallet must be stored so close to walls or other pallets that a fork lift truck does not have sufficient room to maneuver to pick up the pallet from a particulare side. With the pallet of this invention, if any side is open to a space in which the truck can maneuver, that particular pallet may be removed. Likewise, a pallet may at times be in such position that it can be more readily lifted from a corner than from a side. Such operation is permitted with my pallet in its preferred form. Oftentimes, this is the most convenient manner of positioning a loaded pallet in a warehouse corner; or sometimes only a portion of each of two sides will be exposed after the pallet has been lowered into partially overlapping relation to adjacent pallets, as in packing pallets around a post.

Other advantages resulting from the ability to aproach the pallet from any one of its four sides or of its four corners will be readily appreciated, and various problems of packing a number of the loaded pallets in a confined space can be readily conceived of, wherein the 8-way pallet of this invention will be seen to minimize complications and assure speed in handling, as well as permit unstacking the pallets from any starting point without following in reverse a particular order established during stacking, which otherwise might have to be carefully figured out before unstacking.

I claim:

1. A materials handling pallet for supporting articles in such manner that they may be readily transported by conventional fork lift trucks having a pair of parallel projecting forks adapted to lift materials, comprising a base, an elevated platform for receiving articles to be transported, and supporting and spacing members disposed intermediate said base and said platform along marginal edge portions of said pallet and centrally thereof and maintaining said base and said platform in parallel spaced relation, said base, said platform and said supporting members defining on each of at least two adjacent sides of said pallet a pair of openings separated by a supporting member and leading into straight elongated parallel passages separated by the central supporting member for accommodating the forks of a lift truck, whereby said pallet may be lifted by such a lift truck from either one of said adjacent sides of said pallet.

2. A materials handling pallet for supporting articles in such manner that they may be readily transported by conventional fork lift trucks having a pair of parallel projecting forks adapted to lift materials, comprising a base, an elevated platform for receiving articles to be transported, and supporting and spacing members disposed intermediate said base and said platform and maintaining said base and said platform in parallel spaced relation, said base, said platform and said supporting members defining on each of four sides of said pallet a pair of openings separated by a supporting member and leading into straight elongated parallel passages extending entirely through said pallet for accommodating the forks of a lift truck, whereby said pallet may be lifted by such a lift truck from any one of four sides of said pallet.

3. A materials handling pallet for supporting articles in such manner that they may be readily transported by conventional fork lift trucks having a pair of parallel projecting forks adapted to lift materials, comprising a base, an elevated platform for receiving articles to be transported, and supporting and spacing members disposed intermediate said base and said platform at corners, along marginal edges, and centrally of said pallet and maintaining said base and said platform in parallel spaced relation, said base, said platform and said supporting members defining on each of four sides of said pallet a pair of openings separated by a supporting member and leading into straight elongated parallel passages extending entirely through said pallet and separated by the central supporting member, for accommodating the forks of a lift truck, each of said openings also leading into a straight elongated passage extending diagonally into said pallet for accommodating in cooperation with an adjacent opening on an adjacent side of said pallet the forks of a lift truck spanning an intervening corner supporting member and the central supporting member of said pallet, whereby said pallet may be lifted by such a lift truck from any one of four of its sides or from a corner intervening any two of said sides.

4. A materials handling pallet for supporting articles in such manner that they may be readily transported by fork lift trucks having a pair of parallel projecting forks, comprising a base, an elevated platform for receiving articles to be transported, and supporting and spacing members disposed intermediate said base and said platform and maintaining said base and said platform in parallel spaced relation, said base, said platform and said supporting members defining on each of at least three sides of said pallet a pair of openings separated by a supporting member and leading into straight elongated parallel passages for accommodating the forks of a lift truck, whereby said pallet may be lifted by such a lift truck from any one of said three sides of said pallet, the passages leading from openings on one of said sides intersecting both passages leading from openings on adjacent sides, and said base having four apertures each located beneath a point of intersection of two of said passages and serving as an aperture common to two intersecting passages to permit wheels associated with the lift truck forks to be lowered through said base upon insertion of a pair of such forks into any parallel pair of passages leading from any one of said three sides of said pallet.

NORMAN L. CAHNERS.